No. 673,684. Patented May 7, 1901.
H. D. LANE.
ATTACHMENT FOR WEIGHING SCALES.
(Application filed June 4, 1900.)
(No Model.) 5 Sheets—Sheet 1.

Witnesses,
Nathan Kohn
S. Mahlon Unger

Inventor,
Henry D. Lane,
By Joseph A. Minturn
Attorney,

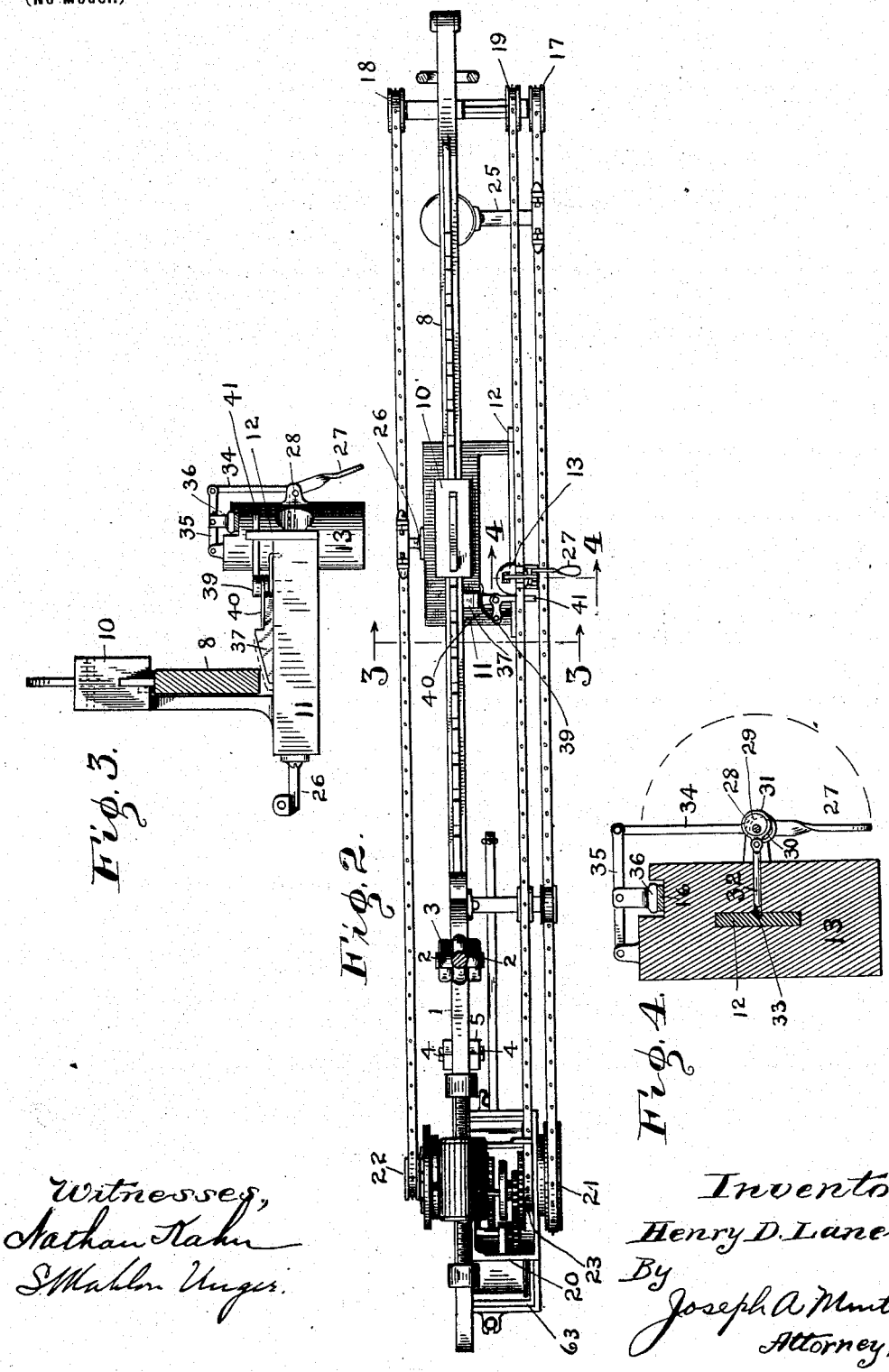

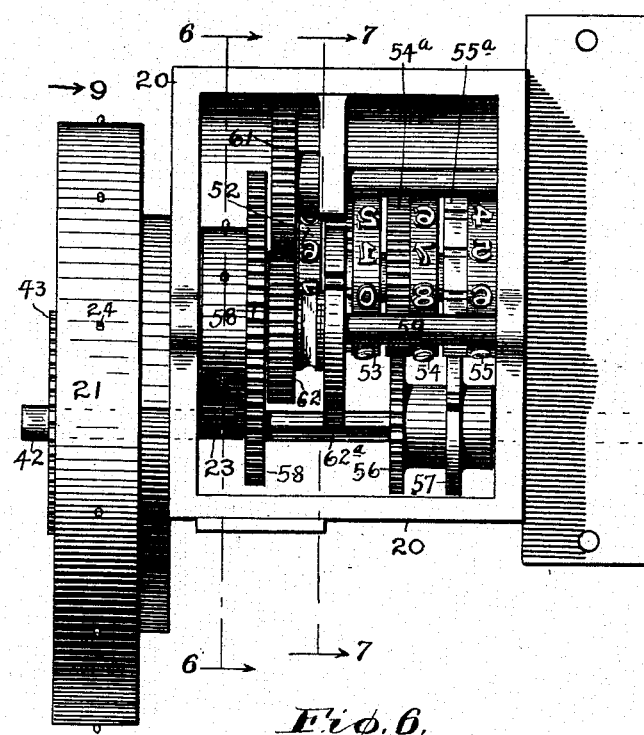

No. 673,684. Patented May 7, 1901.
H. D. LANE.
ATTACHMENT FOR WEIGHING SCALES.
(Application filed June 4, 1900.)

(No Model.) 5 Sheets—Sheet 4.

Witnesses
Nathan Kuhn
S. Mahlon Unger.

Inventor,
Henry D. Lane,
By Joseph A. Minturn
Attorney,

No. 673,684. Patented May 7, 1901.
H. D. LANE.
ATTACHMENT FOR WEIGHING SCALES.
(Application filed June 4, 1900.)
(No Model.) 5 Sheets—Sheet 5.
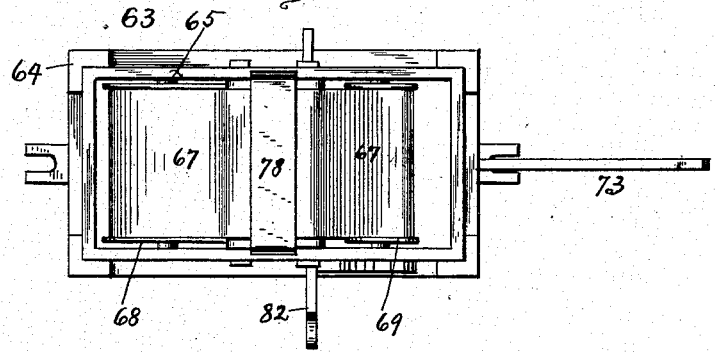
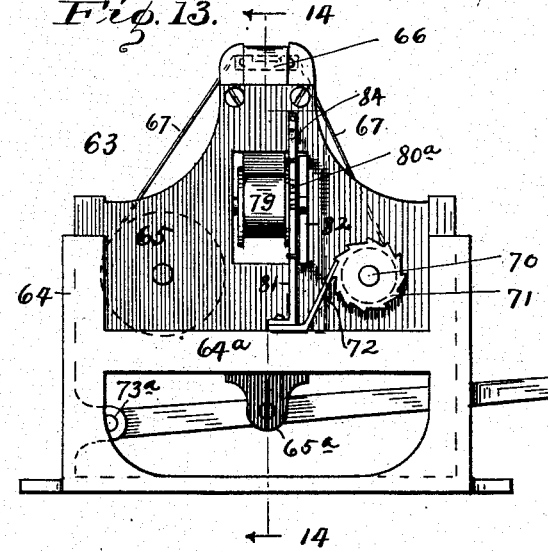
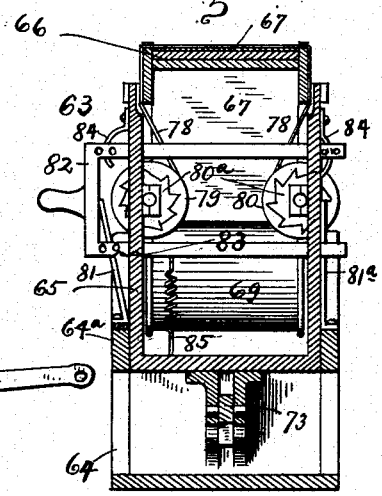
Witnesses,
Nathan Kuhn
E. Wahler Unger
Inventor,
Henry D. Lane,
By Joseph A. Minturn,
Attorney.

UNITED STATES PATENT OFFICE.

HENRY D. LANE, OF INDIANAPOLIS, INDIANA.

ATTACHMENT FOR WEIGHING-SCALES.

SPECIFICATION forming part of Letters Patent No. 673,684, dated May 7, 1901.

Application filed June 4, 1900. Serial No. 19,052. (No model.)

*To all whom it may concern:*

Be it known that I, HENRY D. LANE, a citizen of the United States, residing at Indianapolis, in the county of Marion and State of Indiana, have invented certain new and useful Improvements in Attachments for Weighing-Scales, of which the following is a specification.

This invention relates to improvements in weighing-scales, and is here shown as applied to platform-scales for weighing heavy articles, to which it is particularly well adapted; but it is not intended to limit the invention to such scales; and the object of the invention is to compute the weights registered on the several beams of a compound scale—that is, to add or subtract them, as the case may be—and to finally print the result on a paper strip for record and reference.

The further object of the invention is to provide a simple, inexpensive, and durable device and one that will be automatic in its action.

I accomplish the objects of the invention by the mechanism illustrated in the accompanying drawings, in which—

Figure 1:
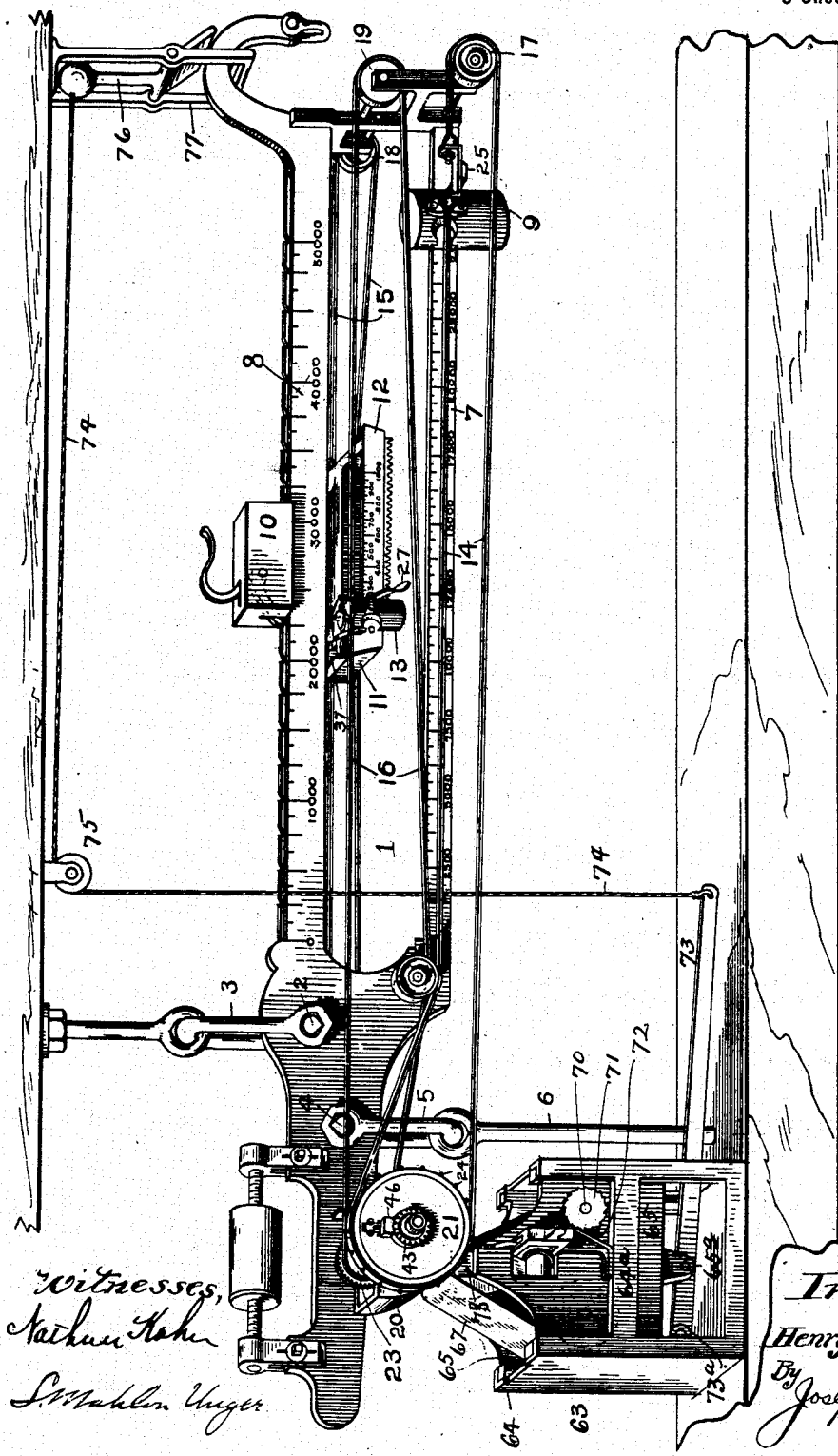
Figure 9:
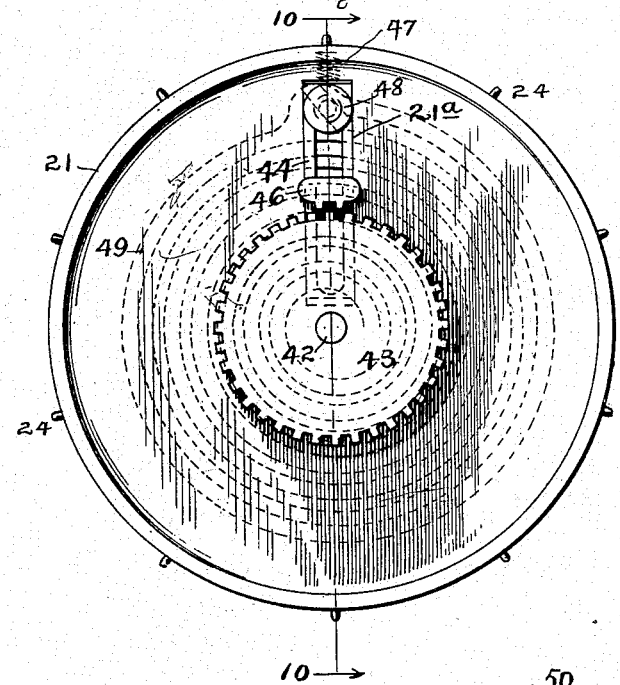
Figure 10:
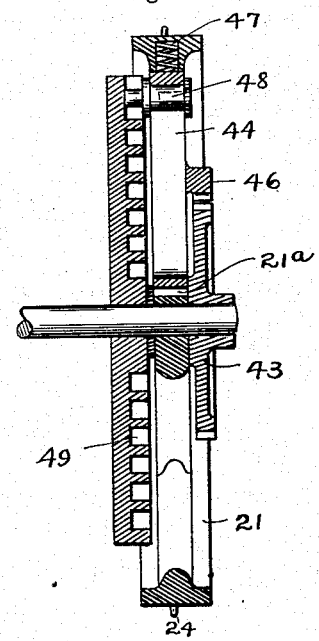
Figure 11:
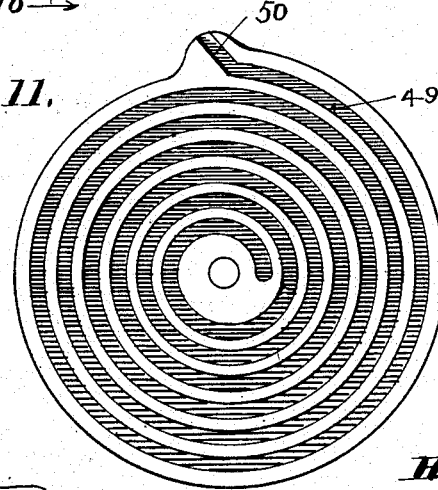

Figure 1 is a side perspective view of a platform-scale beam provided with my improvements; Fig. 2, a top plan view of same; Fig. 3, a cross-section on the dotted line 3 3 of Fig. 2 looking in the direction of the arrows; Fig. 4, a section on the dotted line 4 4 of Fig. 2; Fig. 5, a detail in top or plan view of the gears and disks for computing the weight, the same being shown in an open case and the latter being detached from the scale-beam; Fig. 6, a section on the dotted line 6 6 of Fig. 5, and Fig. 7 a section on the dotted line 7 7 of Fig. 5, both views looking in the direction of the arrows. Fig. 8 is a detail in under side view of the case, showing the numbered disks through an opening in the case. Fig. 9 is an elevation or side view of the largest band-wheel looking in the direction of the arrow 9 in Fig. 5. Fig. 10 is a section of Fig. 9 on the dotted line 10 10 of said figure; Fig. 11, a view of the grooved face of one of the spirally-grooved disks; Figs. 12 and 13, top and side views, respectively, of the printing device; and Fig. 14, a vertical section on the dotted line 14 14 of Fig. 13.

Like numbers of reference indicate like parts throughout the several views of the drawings.

1 represents the scale-beam, having the knife-edge bearings 2 resting in the eye of link 3, by which the beam is suspended, and having knife-edge 4, to which the platform-levers are connected through link 5 and rod 6. The platform-levers are not shown. The parts above named are of the usual and well-known construction, the scale-beam 1 being a compound one, having the lower beam 7 graduated from zero to twenty-five thousand pounds and the upper beam 8 being graduated from zero to fifty thousand pounds. The lower beam 7 has the ordinary sliding poise 9, and the upper beam 8 has the poise 10 resting on top of the beam, and having the expanded frame 11, which gives support to a third scale-beam 12, graduated to weigh from zero to one thousand pounds. Mounted on the beam 12 is the sliding poise 13. All of the parts 10, 11, 12, and 13 are of usual and well-known construction, except as will be hereinafter pointed out and explained.

Connected with the poises 9, 10, and 13 are the belts 14, 15, and 16, preferably of steel, which pass around idlers 17, 18, and 19, supported from the end of the long arm of the scale-beam. Attached to the short arm of the scale-beam is a case 20, having a series of counting-disks, hereinafter to be described, which are actuated by wheels 21, 22, and 23 by their respective belts 14, 15, and 16, which pass around said wheels, the belts being moved by their respective poises as the latter are made to slide in and out on the scale-beams in the operations of balancing the scale. In order to prevent slipping of the belts and consequent inaccuracies in registrations, I provide the peripheries of the wheels 21, 22, and 23 with pins 24 and provide perforations in the belts into which these pins take.

In weighing any object the poise 10 on beam 8, which initially stands at zero, is moved out to the end of the beam 8 if the weight of the article is in excess of the maximum capacity of that beam and is left at said outer end. Then the poise 9 is moved out until the scale is brought within one thousand pounds of a balance, and then the adjustment is completed by moving the poise 13 out on the beam 12. The readings of each scale-beam are registered through the belts and connecting mechanism on the counting-disks in case 20. The belt 14 is connected to the poise 9 by a bracket 25, having a horizontal bar with vertical perforated ends, to which the belt is fastened by passing threaded bolts on the ends of the belt through the perforations and securing by means of a nut on each bolt, which nut also provides for adjusting the length of the belt. A similar bracket 26, fastened to the frame 11, having a like bar with perforated ends, affords attachment for belt 15.

The belt 16 is preferably an endless one and is detachably secured to its poise 13. The initial position of the poise 13 is of course at the zero-point on the beam 12, and it is important that it remain there while the poise 10 is being adjusted on beam 8 and also until a balance on its beam of smallest graduations is sought. The poise 13 has a groove across its upper end to receive the belt 16, as clearly shown in Figs. 3 and 4, and it is necessary that the poise move freely along the belt, as the main poise 10 and its frame 11 are made to travel the beam 8 in getting the adjustment of the poise 10. As the poise 13 requires to be locked to its beam 12 at the zero-point during the time that it is free from the belt 16, and vice versa, I have provided mechanism which performs the proper operations by the throw of a single lever 27. (See Figs. 3 and 4.) This lever 27 is attached to a shaft 28, on which are two eccentrics 29 and 30. A ring 31 on eccentric 29 has jointed connection with a pin 32, which takes into a suitable hole in the poise 13, and by proper manipulation of the eccentric by means of lever 27 can be made to enter a socket 33 in the scale-beam 12 and can be withdrawn by a reverse movement of said lever. The other eccentric, 30, gives longitudinal movement to the rod 34, which attaches to a lever 35, fulcrumed to the top of the poise 13, and this lever has a clamping-foot 36 pivotally secured to it. By pulling down on the outer end of lever 35 by the proper throw of eccentric 30 the foot 36 will be brought down on the belt 16, clamping it between said foot and the poise. The relative arrangement of the two eccentrics 29 and 30 is such that a throw of the lever 27 moves the clamping-foot and the pin, so as to clamp the belt and poise together, when the poise is released, so as to slide on the beam 12.

As previously stated, the poise 10, with its attached base or frame 11, carrying beam 12 and poise 13, is not new. The lower parts are suspended from the poise 10, and to prevent binding of any of the parts with the beam 8 plenty of clearance is left between the bottom of the beam 8 and the top of the frame. This clearance allows the frame to tip longitudinally by the pull of the belt 16 when the poise 13 is moved and causes error in the throw of the wheel 23, which the belt 16 drives. To prevent this tipping of the frame, I provide a wedge 37, which is pivotally secured to a bell-crank lever 38, to the elbow of the latter, said lever being pivotally secured at its end 39 to the frame 11. A spring 40 presses the wedge between the beam 8 and frame 11, and the tension of the spring is overcome to withdraw the wedge by contact of the poise against the long arm 41 of the bell-crank lever. When the poise 13 is locked at zero of its beam, it is also against the arm 41, pressing it so as to withdraw the wedge, thereby leaving the poise 10 and its frame free from the beam 8.

In the scale-beam shown in the drawings all weights up to fifty thousand will be weighed on the beam 8, and in cases where it is desired to go above that amount the second beam 7 is brought into use and an additional twenty-five thousand pounds can be measured.

The belt-wheel 21 is mounted on the shaft 42, so as to turn loosely thereon. The belt-wheel 22 (see Fig. 5) is mounted indirectly on said shaft 42 also; but as it is belted to a heavier poise 10, which registers faster than the poise 9, it is necessary that the wheel 22 be smaller than the wheel 21 in order to give the greater number of revolutions to the shaft 42, which transmits the required movement to the counting-disks. In wheel 21 the radial slot $21^a$ required is obtainable within the dimensions of the web of the wheel; but the reduced diameter of the wheel 22 makes necessary the attachment of that wheel to the disk $22^a$, as shown in Fig. 5, and the disk $22^a$ being loosely mounted on the shaft 42 provides the indirect mounting of wheel 22 on said shaft, as above mentioned. I provide means for connecting the wheel 21 and the disk $22^a$ to shaft 42 in a manner to cause them to rotate said shaft at alternate intervals and during a certain number of revolutions. This mechanism consists of the cogged wheels 43, mounted on shaft 42 outside of each disk 21 and $22^a$ and rotating with the shaft, a spiral groove in the case adjacent to the inner faces of disks 21 and $22^a$, each having as many turns or coils around shaft 42 as it is desired that the respective wheels 21 and 22 should rotate before disengaging from shaft 42, a dog adapted to engage and disengage the cogged wheel 43, a spring to press the dog into engagement with the cogged wheel, and a wrist-pin traveling in the groove and adapted to raise the dog when it reaches the outer end of the spiral groove. The details of this device are clearly shown in Figs. 9, 10, and 11, which represent the belt-wheel 21, that for wheel 22 being the same in general construction. $21^a$ is the radial slot in web of wheel 21. 44 is a slide carrying the dog 46 and working longitudinally in slot $21^a$. It is pressed down to cause the dog to engage the cogs of wheel 43 by the spring 47. This slide is slotted longitudinally and in the slot in the slide works the wrist-pin 48. 49 is the spiral slot in the adjacent end of the case 20. It terminates at its outer end with incline 50, and in the slot travels the projecting end of the wrist-pin 48. At the moment that pin 48 reaches the incline 50 it has also reached to top of its slot in the slide 44, and being forced up the incline the pin raises the slide and disengages the dog from the cogged wheel, thereby freeing the shaft 42 from the band-wheel. This device is fully described and made the subject-matter of an application for patent filed by me in the United States Patent Office May 19, 1900, Serial No. 11,011.

The above-described mechanism is set so that when the wheel 21 is in gear with the shaft 42 the wheel 22 will be out of gear, and vice versa, and the number of coils in the spiral for each belt-wheel is so proportioned with relation to the diameter of the band-wheel and the length of the scale-beam that when the poise controlling it reaches the end of the beam the wrist-pin will be at the outer end of the groove and the dog raised to release the shaft from the belt-wheel.

Mounted in case 20, parallel with shaft 42, is a shaft 51, on which are loosely mounted four counting-disks, each having peripheral raised digits from "0" to "9," inclusive, which project, as shown in Fig. 7, through a slot in the bottom of the case. A stationary "0" is fixed to the case at one end of the slot, as shown in Fig. 8. The disk 52 next to it represents the tens-column of numerals, 53 the hundreds-column, 54 the thousands-column, and 55 the tens-of-thousands column. These disks are all loosely mounted on their shaft and are independently movable. The disk 54 is integral with a cogged wheel $54^a$, which engages the teeth of a cog-wheel 56 on the shaft 42. When the shaft 42 is rotated by either of the band-wheels 21 or 22, all weights over one thousand and under ten thousand will be indicated by the numerals of disk 54. Turning with shaft 42 is a wheel 57, having only one tooth, and integral with the disk 55 is a wheel $55^a$, having ten notches, into which, in succession, the tooth of wheel 57 takes, thus registering the pounds of ten thousand and over on the disk 55. The balances on either of the scale-beams 7 and 8 will be counted on these two disks 54 and 55. Any weight under one thousand or of fractional parts of a thousand at any point on the scale-beams 7 and 8 will have to be taken on the beam 12, and these small and fractional weights are counted on disks 52 and 53. As shown in Figs. 5 and 6, the belt from poise 13 passes around wheel 23, and the latter is attached to the cogged wheel 58, mounted on shaft 59. The cogs of wheel 58 mesh with the cogs of the small pinion 60, which is integral with the cog-wheel $52^a$, which is a part of the disk 52. This registers pounds from ten up to ninety. The pounds from one hundred up to nine hundred are indicated by the figures of the next disk 53 by means of the following train of gears: $52^a$ meshing with cog-wheel 61 and 61 meshing with cog-wheel 62, loosely mounted on shaft 59 and connected with an integral wheel $62^a$, having but one tooth, which takes at each successive revolution into one of a series of ten notches in the periphery of wheel $53^a$ integral with wheel 53.

The peculiar construction of the notched wheels $53^a$ and $55^a$ is clearly shown in Fig. 7. The space between each of the ten notches of the periphery of the wheels is concaved on a curvature the same as the radius of the one-toothed wheel working in conjunction with it, so that the rim of the one-toothed wheel fits into the concave and forms a lock until the one tooth comes around and moves the notched wheel forward or back, as the case may be.

The scale as here shown is for weighing large bodies, and it will be noted that the counting-disks will not register any amount under ten pounds, because those small weights can be disregarded without making any material difference; but should it be required to register under ten pounds a fifth disk carrying numerals from "0" to "9" will be substituted for the stationary part now carrying the zero-mark in the units-column and the belt-wheel 23 would be geared or connected to operate said fifth disk and the next two disks connected to this one in the units-column by means of the same kind of mechanism above described for moving a disk of higher denomination from one of a lower denomination. A counter actuated by similar belt connection with the sliding poise may be used on a scale having only a single graduated beam and in that case the belt-wheel of the counter will be attached directly to the shaft on which it is mounted without the spiral groove, dog, &c.

It only remains now to describe the device by which the readings of the counting-disks are printed for record after each load or body has been weighed.

63 represents a printing-press. (Shown in perspective in Fig. 1 and in plan side elevation and vertical section in Figs. 12, 13, and 14, respectively.) An outside frame 64 forms a guide for a vertically-reciprocating body 65, having a horizontal bed-plate 66 at its top, over which a belt of paper 67 passes. The paper is wound on a drum or roll 68, placed on one side of the bed, and passing from thence up and over the bed is wound upon a spool or drum 69 on the other side of the bed. The shaft 70, on which the spool 69 is mounted, has the ratchet-wheel 71, and the cross-bar $64^a$, which, of course, is stationary, has a spring-dog 72, which engages the teeth of the ratchet-wheel and causes said wheel to rotate to wind the paper upon its spool at each rise and fall of the body. Under the body and fulcrumed at $73^a$ to the frame 64 is a lever 73, the outer end of which is connected to cord 74, which passes up and over the idle pulley 75 and is attached to the weighted arm of the lever 76, the latter being the lever of well-known construction which is employed to steady the scale-beam after the balance is had and while the reading of the scale is being taken. This is done by throwing the weighted arm over, so as to impinge the end of the beam between the lower arm of the lever and the link 77. The lever 73 is pivoted to the under side of the body 65 at 65ª, whereby when the outer end of the lever is raised the body 65 will be elevated and the paper on the bed-plate 66 brought into contact with the numerals or types on the bottom of the counting-disks. The raising of the outer end of the lever is obtained by the pull of the cord 74 when the lever 76 is thrown over to lock the scale-beam. A return of the lever to vertical position releases the cord and lever and allows the body to fall by gravity. Ink for making the impressions from the numerals upon the strip of paper is supplied by the inked ribbon 78, which passes transversely across the paper over the bed-plate and is wound from spool 79 onto spool 80 by the action of the spring-dog 81, also fastened to stationary bar 64ª and engaging the teeth of the ratchet-wheel 80ª, which rotates its adjacent drum by the rise and fall of the body 65. The spools 79 and 80 have oppositely-sloped ratchet-tooth wheels 80ª and spring-pawls for each, 81 and 81ª, to reverse the direction of movement of the drums; but, as is well understood, only one dog must be in action at a time, and I provide a slide 82 with pins to control the dogs 81 and 81ª, so that by moving the slide one or other of the drums can be thrown in or out of action. Notches 83 will hold the slide in any position given to it. Springs 84 prevent back action of the ratchet-wheels. The purpose of this double mechanism and slide is to reverse the direction of the ribbon when it is necessary to do so. The frame is drawn down to make a lock in its notches by the spring 85.

I claim—

1. The combination with a scale-beam of a sliding poise, a frame suspended from the poise and extending under the beam said frame carrying an auxiliary beam also having a sliding poise, and a tapering body adapted to be interposed between the frame and the first-mentioned beam when the second beam is in use to prevent tilting of the frame.

2. In a weighing-scale, a scale-beam, a sliding poise working thereon, a counting device, a belt from the poise to the counting device, an eccentric for locking the poise to the scale-beam, and means comprising a second eccentric mounted on the same shaft with the first eccentric, a lever connected with the second eccentric and a clamping-foot connected with the lever, for fastening the belt to the poise when the poise is unlocked and free to be moved on the beam, substantially as specified.

3. In a weighing-scale, a beam having a socket, a poise sliding thereon, a belt, a shaft, a lever to rock the shaft, a double eccentric on said shaft, a pin connected with one eccentric and passing through the poise to engage the socket in the beam, a link-bar having a ring surrounding the other eccentric, a lever to which the bar is attached, and a foot on the bar adapted to impinge the belt between it and the poise and lock it to said poise at the times when the pin is withdrawn from the socket in the beam.

4. In a weighing-scale, having scale-beams and sliding poises, a lever to steady the outer end of the beam, a registering device comprising a plurality of counting-disks geared together and each having numerals in relief, a press having a printing surface or plate over which a belt of paper is drawn, and an inked ribbon outside of the paper, said press being under the disks and having movement into contact therewith, a lever to raise said press and a cable attached to the lever supporting the press and passing thence over a pulley and then attached to the steadying-lever at the outer end of the scale-beams, substantially as described and shown.

5. In a scale, beams having sliding poises, a counting device connected with the poises to indicate or express the combined readings of the scale-beams on numbered disks, a printing-press adapted to be brought into contact with the numbered disks, a steadying-lever at the outer end of the scale-beam and means connecting the lever and press whereby the throw of the lever will actuate the press to print off the readings of the numerals of the disks.

6. In a weighing-scale, the combination of a beam, having a plurality of graduated bars, and poises sliding on said bars, a counting device to compute and record the readings of the scale - beams, belts connecting the sliding poises with the counting device, said counting device comprising a case, shafts supported by the case and carrying counting-disks representing units, tens, hundreds, and thousands columns, &c., a train of gears connecting the disks whereby each revolution of a disk will cause the next one above to make one-tenth of a revolution, spiral grooves on the case around a belt-shaft, a belt-shaft, a belt-wheel mounted loosely on the belt-shaft, a toothed wheel fixed on the belt-shaft, said belt-wheel having a radial slot, a dog working in said slot, a spring to press the dog into engagement with the toothed wheel and a wrist-pin engaging the dog and taking into the spiral groove, said groove having an incline at its outer end to lift the dog out of engagement with its toothed wheel by action on said wrist-pin, all substantially as described and specified.

In witness whereof I have hereunto set my hand and seal, at Indianapolis, Indiana, this 24th day of May, A. D. 1900.

HENRY D. LANE. [L. S.]

Witnesses:
J. A. MINTURN,
S. MAHLON UNGER.